United States Patent [19]

Taff

[11] 4,182,272
[45] Jan. 8, 1980

[54] ANIMAL TRAINING DEVICE AND METHOD

[76] Inventor: Anthony Taff, P.O. Box 7261, Philadelphia, Pa. 19101

[21] Appl. No.: 872,574

[22] Filed: Jan. 26, 1978

[51] Int. Cl.² ............................................. A01K 27/00
[52] U.S. Cl. ..................................... 119/29; 119/109
[58] Field of Search ........................ 119/109, 29, 106

[56] References Cited

U.S. PATENT DOCUMENTS

| | | | |
|---|---|---|---|
| 2,337,970 | 12/1943 | Cassell | 119/109 |
| 3,244,149 | 4/1966 | Bosko et al. | 119/29 |
| 3,376,855 | 4/1968 | Mescher | 119/29 |
| 3,964,441 | 6/1976 | Wall | 119/109 |

*Primary Examiner*—Hugh R. Chamblee
*Attorney, Agent, or Firm*—Eugene E. Renz, Jr.

[57] ABSTRACT

An animal training device and training methods especially useful for dogs, are described in which an elongated rigid staff, preferably with a cane or crook-shaped handle at one end, is provided with an extensible tensioning means such as a coil spring to which a leash for the animal is attached; the leash being led through one or more guides on the staff, the last guide being spaced above the lower end of the staff. In one training method the upper end of the staff is pivotally attached to a fixed object and the dog is thus tethered by means of the leash, whereby, when the dog lunges away from the fixed object the leash becomes taut tensioning and extending the spring and sharply pivoting the staff so that the lower end thereof non-injuriously contacts and chastens the dog and the retraction of the spring draws the dog gently but firmly back into its previous at rest position. The device may also be used manually to teach the dog to heel or respond to other commands.

5 Claims, 7 Drawing Figures

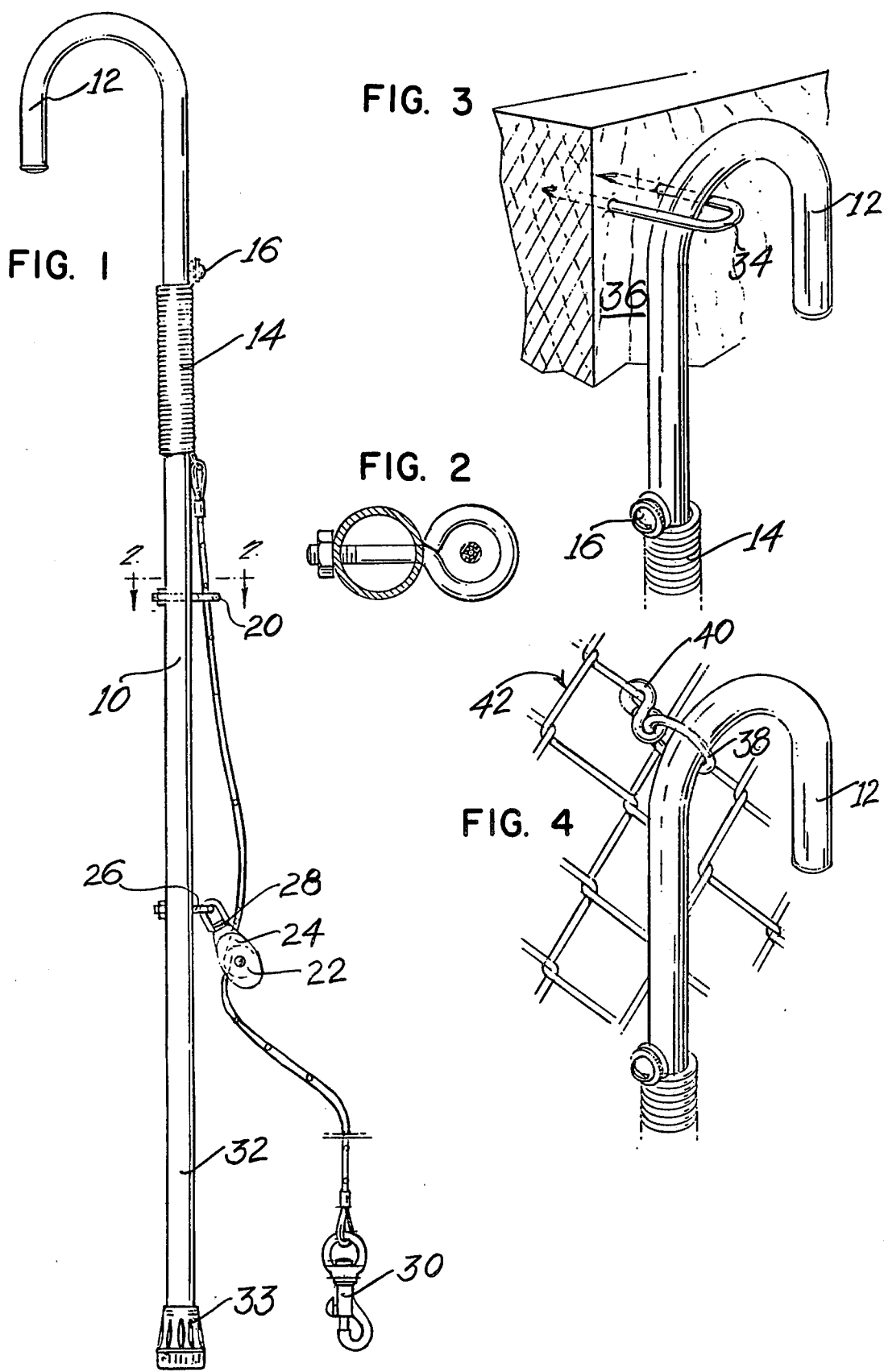

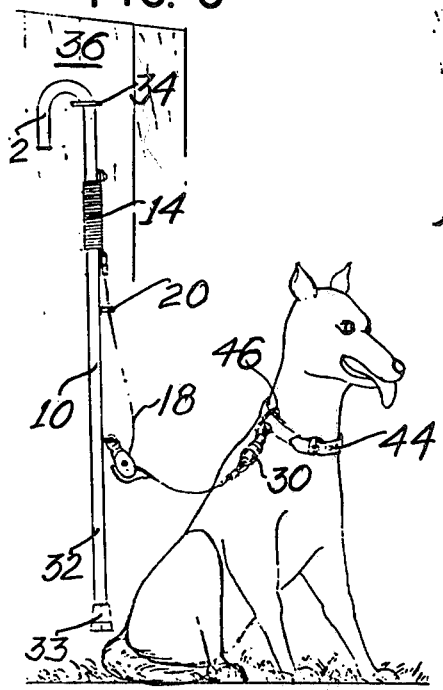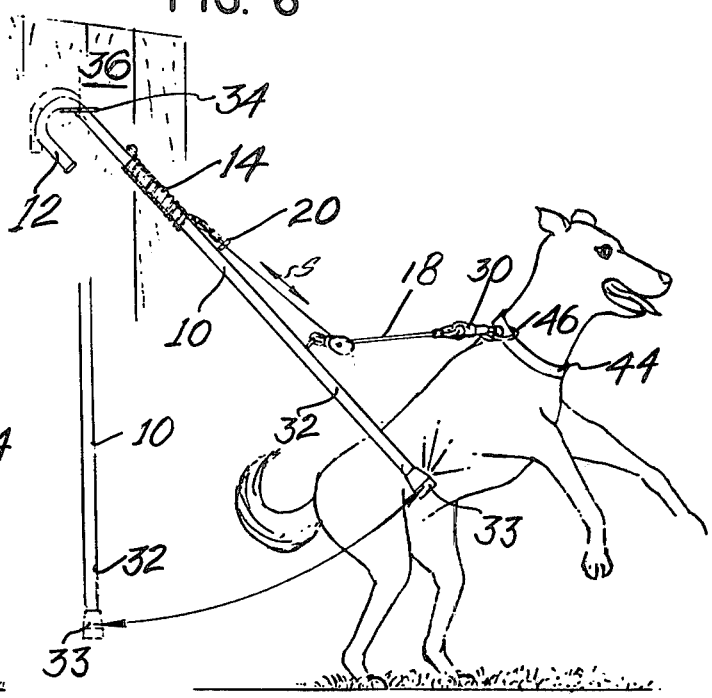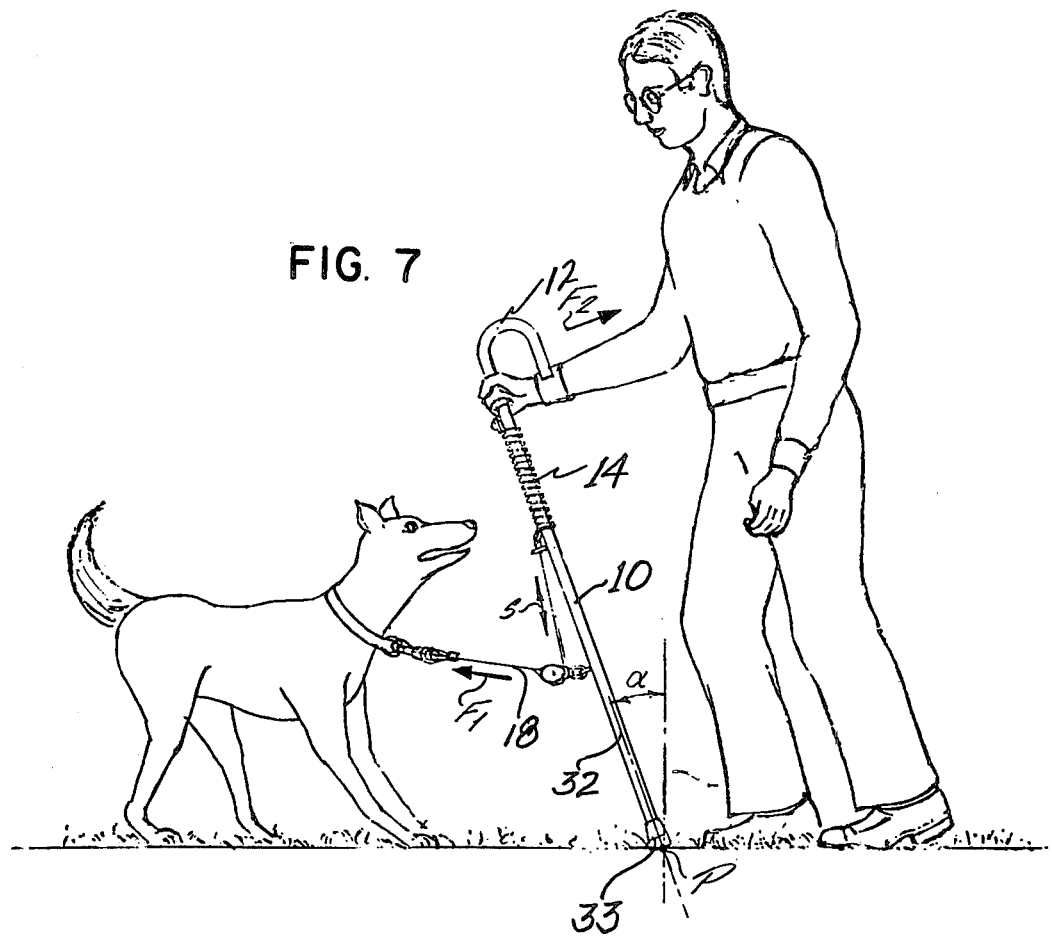

ANIMAL TRAINING DEVICE AND METHOD

BACKGROUND OF THE INVENTION

Animals of many species and particularly dogs, which are to be kept as pets, for hunting or for security reasons, require training to make them amenable to command and otherwise suitable for these purposes. The general procedures for training dogs for a variety of uses are well-known and widely described in the literature. A wide variety of training devices have been employed in such procedures. Unfortunately, many of the devices used previously have been inhumane in some degree. For example, dogs have been controlled by devices that administer a pinch, prick, physical jerk, jolt or buzz or an electrical shock, all of which tend to leave a lingering cutaneous sensation. Due to the pain, shock or discomfort inflicted on dogs by such devices the animals may be more or less permanently mentally or emotionally traumatized and made fearful of or antagonistic to all humans. In any event such devices must invariably hinder the creation of a bond of mutual trust and affection between the dog and handler or trainer and thus clearly act as a hindrance to the efficiency of training and the quality of the obedience achieved.

It is apparent, therefore, that a need has existed in the art for a device which will chasten an unruly dog and teach him to behave in a quieter manner without the dog attributing inhumane chastisement directly to the handler or trainer.

It is an object of the present invention, therefore, to provide a humane animal training device which is adapted to chasten the animal without imparting residual cutaneous effect or mental or emotional trauma to the animal, and which does so without the chastisement being directly attributed to the handler or trainer.

It is a particular object of the invention to provide a device of this character which will teach a dog that it is to his advantage to sit or move quietly rather than by lunging and leaping as untrained dogs are inclined to do.

It is another object of the invention to provide a training device which becomes identifiable to the animal as a symbol of authority and obedience but which does not represent painful chastisement.

It is still another object of the invention to provide a device for controlling a dog and training it to heel and walk or run with the handler.

It is yet another object of the invention to provide a dog training device which is adapted to train a dog without the presence of a handler not to lunge or jump by tethering the dog to a fixed object.

It is another and more specific object of the invention to provide a dog training device adapted to beheld manually by a handler or pivotally connected to a fixed object and which includes a staff, a leash and a spring so connected that when a dog is leashed thereon the staff is brought into contact with the dog but without lasting physical or traumatic mental effect when the dog lunges or leaps, thus humanely training the dog to avoid such behavior.

SUMMARY OF THE INVENTION

The foregoing and other objects of the invention, which will become apparent hereinafter, are achieved by providing a training device for dogs or other animals which includes an elongated staff with or without a crook- or cane-shaped handle at its upper end and to which a leash is attached by means of an extensible tensioning device such as a spring. The tensioning device is preferably mounted on the upper portion of the staff and the leash led downwardly therefrom through one or more guide means therefor, the last such guide means being spaced well above the lower end of the staff. When a dog is connected to the free end of the leash of such a device and the upper end of the device is held either manually or by pivotal connection to a fixed object, the device will humanely teach the dog not to lunge or leap. This is due to the fact that when a dog lunges or leaps, the rapid movement tautens the leash against the tensioning device causing it to be tensioned and extended. The taut leash exerts a pull on the lowermost guide causing the staff of the device to pivot about its manually or mechanically restrained upper end. This action of the leash brings the portion of the staff below the lowermost guide into contact with the dog or other animal as its strains forward on the leash. The contact of the staff with the animal will be as strong or sharp as the movement of animal, but inasmuch as the lower end of the staff is made smooth and blunt, the animal will not be physically injured or traumatized in any way. Indeed, inasmuch as the impetus for the contact of the staff with the animal is the animal itself, the chastisement is self regulating in force to the strengh of the animal which is generally proportional to the animal's ability to absorb punishment. For example, a small dog cannot inflict a sharper blow on itself than it can easily tolerate simply because it does not have the strength to do so. A larger dog will, of course, inflict a stronger or sharper blow on itself than a small dog, but is correspondingly larger boned and heavier and thus able to sustain such a blow without injury.

The device provided in this way is useful in a wide variety of training procedures as will be apparent to those skilled in the art. For example, initial training of an unruly dog may be accomplished by simply attaching the dog to the leash of the device and pivotally connecting the upper end of the staff to a fixed object such as a wall, tree or post so that the lower end of the staff is spaced slightly above the ground and free to swing. The dog may then be left alone so tethered for a predetermined training period or the handler may remain present and give the dog oral commands, encouragement or chastisement in accordance with the dog's experience with the training device. As noted above when the dog lunges or leaps forward the device will give it a correspondingly sharp or strong blow or pressure with the lower end of the staff. Such an occurrence can be accompanied by a suitable word or signal of disapproval from the handler. After such a lunge the leash will have extended the tensioning device or spring which will then exert a gentle but firm pull on the dog tending to draw it back into its previous rest position. This rearward drawing action may also be accompanied by a suitable word of command or approval which the dog will learn to associate with the action. Again when withdrawal of the dog is completed by the training device, the at rest position of the dog can be named by the handler until the dog associates the position with the word or command.

In addition to the fact that the dog receives no lingering cutaneous or other trauma, the device has the further advantage that the physical chastisement is associated with the training device or staff rather than with the handler. In this way the dog learns what is acceptable behavior without developing any antagonism or disaffection for the handler.

The training device may also be used manually to teach the dog to heel, walk, run or exercise with the handler by proper manipulation and associated commands, while keeping the dog under control during the training procedure as will be explained more fully below. In this context the device becomes an authority symbol for the dog and merely attaching it to the dog's collar will induce obedience.

BRIEF DESCRIPTION OF THE DRAWINGS

FIG. 1 is a side elevational view of a preferred animal training device of the invention;

FIG. 2 is a plan view, partially in section, showing the upper guide means of the device of FIG. 1 on an enlarged scale;

FIG. 3 is a perspective view on an enlarged scale of the upper handle portion of the device of FIG. 1 shown pivotally affixed to a stationary object;

FIG. 4 is a perspective view, on an enlarged scale, of the upper handle portion of the device of FIG. 1 pivotally connected to a chain link fence;

FIG. 5 is a view of the device of FIG. 1 in use tethering a dog to a wall; the dog being in sitting position;

FIG. 6 is a view on a larger scale of the device and dog of FIG. 5 with the dog in lunging action and the device in operation chastening the dog; and FIG. 7 is a view of the dog and device of FIG. 5, the latter being manually employed by a handler to teach the dog to heel.

DETAILED DESCRIPTION OF THE INVENTION

A preferred embodiment of the animal training device of present invention as shown in FIG. 1, comprises an elongated staff 10 which may be composed of any suitable rigid material such as a metal tube, solid wood, fiberglass or the like. The staff 10 may flex to some degree, if desired, depending on its material of construction, but must be sufficiently stiff to control the animal, pivot about its upper end and strike the animal firmly with its lower end when the tethered animal lunges. The staff 10 preferably, but optionally, has a crook- or cane-shaped handle 12 at its upper end as shown. Such a handle 12 serves not only for manually gripping the device but also for pivotally anchoring it to suitable fixed structures as by a fixed ring, loop, bar or hook. An extensible tensioning means such as the coil spring 14 coaxially surrounding the staff 10 is mounted on the upper portion of the latter by suitable fastening means such as screw and washer means 16 extending through the ring at the upper end of the spring 14 and being threaded into the body of the staff. The placement of the spring 14 may be varied upwardly or downwardly and it may even be positioned below the mid-point of the staff, if desired, but it is preferably located on the upper portion of the staff as shown. Any suitable extensible tensioning means other than a coil spring may also be employed, such as resilient cords or cables of metal or elastic material, and the tensioning means, whether a spring or other device need not surround the staff.

A leash 18 of suitable length and material is connected to the lower free end of the spring 14 by any suitable means such as the ring and loop shown. The leash may be of rope, leather, chain or cable but is preferably of flexible and smooth character. One or more guides are provided for the leash such as eye bolt 20. As shown on an enlarged scale in FIG. 2, the eye bolt 20 may extend through the staff 10 which in this case is shown as a hollow metal tube, and be fastened with a nut as shown, or any equivalent means. The leash 18 is led through the eye of the eye bolt or upper guide means as shown and is free to move upwardly or downwardly therein. A second guide means is mounted on the staff below the first guide means, but spaced above the lower end of the staff. In the preferred embodiment shown in FIG. 1 this second guide means takes the form of a sheave or pulley 22 in a block 24 connected to a suitable mounting means 26 on the staff, through a swivel 28. The mounting means 26 may be a suitable eye bolt and nut similar to guide 20 or any other suitable fastening means for the pulley. The leash 18 is led through the pulley and around the sheave 22. The sheave 22 may be fixed but is preferably rotatable to reduce friction on the leash. The leash 18 is terminated by means of a conventional snap swivel 30 or other suitable means for connecting it to the attachment device of an animal collar or shoulder harness.

As noted above, the lowermost guide means for the leash, in this case the pulley mechanism, must be mounted on the staff at a suitable distance above the lower end thereof to provide an animal contacting portion of the staff 32. This portion of the staff must be smooth and relatively blunt so as not to injure the animal and may be provided with a rubber or plastic tip 33 or other suitable device to protect the animal from any injury by the end of the staff. Optionally the staff, if solid, may be provided with a rounded end. The rubber cap 33 is preferred, however, since it also provides frictional contact with the ground in training the animal to walk or run with its handler.

One means of pivotally anchoring the upper end of the training device is shown in FIG. 3 in which the curved handle of the staff is passed through a large U-shaped staple 34 driven into a wall 36, post, tree or other fixed object capable of withstanding any force applied by the tethered animal. The handle 12 of the staff fits loosely in the opening of the staple 34 thus permitting pivotal movement of the staff.

Another restraining or anchoring means for the training device is shown in FIG. 4 in which a ring 38 is connected to a chain link fence 42 by an S-hook 40. Here again the handle 12 fits into the ring 38 loosely and the loosely but securely fastened S-hook 40 permits the staff of the training device to pivot about the point of attachment.

The operation of the training device and one of the training methods of the invention are shown in FIGS. 5 and 6. The dog in FIG. 5 is tethered to a fixed object, in this case a wall 36, by means of a preferred embodiment of the invention. The training device is pivotally connected to the wall 36, as shown on a larger scale in FIG. 3, by inserting the handle 12 through the large staple 34 driven in the wall. As seen in FIG. 5, when the dog is at rest in a sitting position the training device hangs freely on the wall 36 with the leash 18 untensioned, thus permitting the dog to rest comfortably. When the dog lunges forward as seen in FIG. 6, however, the dog's collar 44 with its attachment ring 46 connected to the snap swivel 30 brings the leash 18 taut and extends and tensions the coil spring 14. This causes the training device to pivot in the staple 34 encircling the handle 12 of the staff 10. As shown in FIG. 6 this pivotal movement of the staff 10 swings the lower free end of the staff 32 with the rubber cap 33 into contact with the dog. Such contact of the lower portion of the staff with the dog may be relatively gentle if the dog moves forward slowly or it may be a relatively sharp but non-injurious blow if the dog lunges sharply. In any event when the dog exerts his strength and weight on the leash as shown in FIG. 6, the spring 14 is elongated and tensioned. As a result, the tension in the spring exerts a pull on the leash against the straining dog and as the spring contracts to its normal untensioned condition the dog is drawn gently but firmly backward to its former sitting or inactive position.

The device of the present invention may be manufactured in varying sizes and weights for the control and training of dogs of varying weight and strength. Moreover, where it is not necessary to vary the length and weight of the staff and leash it is possible to adapt a given device to animals of varying size simply by changing the spring to a heavier or lighter spring, as necessary. Also the height above the ground of the lower most guide means or pulley can be varied depending upon the size of the dog. It is preferred, therefore, to provide a plurality of holes in the staff at varying heights above the ground so that the position of the pulley may be adjusted by simply moving the eye bolt 26 upward or downward on the staff.

Another training method of the invention is partially illustrated in FIG. 7 wherein a handler is shown facing a dog attached to the leash and the friction tip of the staff is firmly planted on the ground. The staff 10 is advanced toward the dog by the handler with his right hand as he steps toward the dog with his right foot. The dog may be in sitting position, preferably, but may be up and straining against the leash as shown or standing quietly. The handler then brings the upper portion of the staff toward himself as shown by the arrow in FIG. 7 thus tensioning the leash and urging the dog forward. The handler then pivots on his right foot to turn his body in the opposite direction and place the dog at his left heel. The dog is encouraged to follow the handler's left leg with the leash comfortably loose. When the dog has been placed in the proper heel position, i.e., at the handler's left heel, and has accepted that position as the handler walks forward, the command "heel" is spoken. In this way the dog associates the command with the position and will soon learn to move to heel when so commanded.

It will be apparent from the foregoing that the new training device has many uses and advantages. For example, an untrained and unruly dog may be initially conditioned prior to more complex training, by simply tethering it to a wall or other fixed object by means of the training device for a certain period each day until the dog learns that unruly conduct is not to his advantage. During this period the dog will also learn to associate the training device with chastisement or authority requiring quiet behavior in much the same manner as seeing eye dogs for the blind, once trained, associate the work harness and handle with strict obedience to duty. In this way the training staff itself becomes a primary inducement to proper behavior and obedience to authority. The primary inducement of the staff may then be supplemented by oral or visual commands of the handler. Therefore, when the dog is allowed to run free reattaching it to the leash and staff immediately re-establishes the previously learned attitude of obedience and aids in controlling the dog or in the further training thereof. The staff is also useful, of course, in controlling the dog in the presence of other dogs running free and in defending the dog and handler from such dogs. When an unruly dog has thus been trained to respect the staff, it is then possible to proceed with more complex or meaningful training by any of the methods or procedures known in the art, but assisted by the excellent control of the device of the present invention.

While the training device of the present invention has been described in connection with the preferred embodiment shown in the drawings, those skilled in the art will recognize that this was done merely for illustrative purposes and that many other embodiments of the invention are contemplated within the scope of the appended claims.

What is claimed is:

1. An animal training device comprising, in combination,
   (a) an elongated staff,
   (b) an elongated leash,
   (c) extensible spring tensioning means mounted on said staff and connecting said leash thereto,
   (d) guide means mounted on said staff below said extensible spring tensioning means through which the free end of said leash is led, said leash being extensible and retractable through said guide means under the tension of said extensible spring tensioning means, said guide means comprising a ring member mounted on said shaft and spaced below the maximum normal extension of said spring tensioning means and a pulley member mounted on the lower portion of the staff but spaced from the lower end thereof, and
   (e) means for attaching the upper end of the staff to a fixed object.

2. An animal training device according to claim 1 wherein the means for attaching the upper end of the staff to a fixed object is a handle extending from the upper end of the staff curved backwardly so that the end thereof extends in generally spaced parallel relation to said staff.

3. An animal training device according to claim 1 wherein the extensible spring tensioning means is a coil spring.

4. An animal training device according to claim 3 wherein the coil spring coaxially surrounds said staff.

5. An animal training device comprising, in combination
   (a) an elongated substantially rigid staff having a curved cane-like handle at the upper end thereof and a lower end provided with means for contacting the ground or the animal to be trained without injury to the latter,
   (b) an elongated leash,
   (c) an extensible coil spring coaxially surrounding the staff and having its upper end fixedly attached to the upper portion of the staff below said handle, said leash being connected to the lower free extensible end of said spring,
   (d) a first guide means for said leash mounted on said staff below said spring and spaced therefrom a distance greater than the normal extension of said spring, and
   (e) as a second guide means, a pulley mounted on the lower portion of said staff but spaced from the lower end thereof.

* * * * *